US011057420B2

(12) United States Patent
McGrew et al.

(10) Patent No.: US 11,057,420 B2
(45) Date of Patent: *Jul. 6, 2021

(54) DETECTION OF MALWARE AND MALICIOUS APPLICATIONS

(71) Applicant: Cisco Technology, Inc., San Jose, CA (US)

(72) Inventors: David McGrew, Poolesville, MD (US); Andrew Zawadowskiy, Hollis, NH (US); Donovan O'Hara, Acton, MA (US); Saravanan Radhakrishnan, Bangalore (IN); Tomas Pevny, Modrany (CZ); Daniel G. Wing, Truckee, CA (US)

(73) Assignee: Cisco Technology, Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/370,853

(22) Filed: Mar. 29, 2019

(65) Prior Publication Data
US 2019/0230095 A1 Jul. 25, 2019

Related U.S. Application Data

(63) Continuation of application No. 14/820,265, filed on Aug. 6, 2015, now Pat. No. 10,305,928.

(51) Int. Cl.
*H04L 29/06* (2006.01)

(52) U.S. Cl.
CPC ........ *H04L 63/145* (2013.01); *H04L 63/1408* (2013.01); *H04L 63/166* (2013.01); *H04L 69/16* (2013.01); *H04L 2463/121* (2013.01)

(58) Field of Classification Search
CPC . H04L 63/145; H04L 63/166; H04L 63/1408; H04L 69/16; H04L 63/1416; H04L 63/1425
See application file for complete search history.

(56) References Cited

U.S. PATENT DOCUMENTS

| 6,363,477 B1 | 3/2002 | Fletcher |
| 6,467,008 B1 | 10/2002 | Gentry |

(Continued)

FOREIGN PATENT DOCUMENTS

| CN | 1602470 | 3/2005 |
| EP | 1 684 463 A1 | 7/2006 |

OTHER PUBLICATIONS

Takamasa Isohara et al., "Kernel-based Behavior Analysis for Android Malware detection", 2011 IEEE Computer Society, pp. 1011-1015. (Year: 2011).*
Brandon amos et al., "Applying machine learning classifiers to dynamic Android malware detection at scale", 2013, IEEE, pp. 1666-1671. (Year: 2013).*
McGrew, U.S. Appl. No. 14/820,265, filed Aug. 6, 2015, Office Action dated Jun. 30, 2017.

(Continued)

*Primary Examiner* — Luu T Pham
*Assistant Examiner* — Canh Le
(74) *Attorney, Agent, or Firm* — Behmke Innovation Group LLC; James M. Behmke; Jonathon P. Western

(57) ABSTRACT

A method comprises receiving, at a network infrastructure device, a flow of packets, determining, using the network infrastructure device and for a first subset of the packets, that the first subset corresponds to a first datagram and determining a first length of the first datagram, determining, using the network infrastructure device and for a second subset of the packets, that the second subset corresponds to a second datagram that was received after the first datagram, and determining a second length of the second datagram, determining, using the network infrastructure device, a duration value between a first arrival time of the first datagram and a second arrival time of the second datagram, sending, to a collector device that is separate from the network infrastructure device, the first length, the second length, and the duration value for analysis.

16 Claims, 5 Drawing Sheets

(56) References Cited

U.S. PATENT DOCUMENTS

| | | | |
|---|---|---|---|
| 7,735,116 B1 | 6/2010 | Gauvin | |
| 8,806,644 B1* | 8/2014 | McCorkendale | H04L 63/1416 713/188 |
| 9,158,604 B1 | 10/2015 | Christodorescu | |
| 2003/0048793 A1 | 3/2003 | Pochon | |
| 2003/0226017 A1 | 12/2003 | Palekar | |
| 2005/0050316 A1* | 3/2005 | Peles | H04L 63/0428 713/151 |
| 2006/0133365 A1 | 6/2006 | Manjunatha | |
| 2006/0212572 A1* | 9/2006 | Afek | H04L 63/1491 709/225 |
| 2009/0117530 A1* | 5/2009 | Capone | G09B 5/00 434/362 |
| 2009/0227293 A1 | 9/2009 | Yulo | |
| 2010/0014420 A1 | 1/2010 | Wang et al. | |
| 2010/0085980 A1 | 4/2010 | Hinosugi | |
| 2011/0149793 A1* | 6/2011 | Kim | H04L 41/142 370/253 |
| 2011/0179484 A1* | 7/2011 | Tuvell | H04L 63/145 726/22 |
| 2012/0153868 A1 | 6/2012 | Gu et al. | |
| 2012/0216280 A1* | 8/2012 | Zorn | G06N 7/005 726/23 |
| 2012/0255019 A1* | 10/2012 | McNamee | G06F 21/554 726/24 |
| 2013/0061325 A1* | 3/2013 | Singh | G06F 21/56 726/24 |
| 2013/0097660 A1 | 4/2013 | Das | |
| 2014/0080486 A1 | 3/2014 | Nitta | |
| 2014/0141768 A1* | 5/2014 | Javaid | G06F 11/3072 455/423 |
| 2015/0200860 A1 | 7/2015 | Kampeas | |
| 2015/0213365 A1* | 7/2015 | Ideses | H04L 63/14 706/12 |
| 2015/0278860 A1 | 10/2015 | Rayanchu | |
| 2016/0315954 A1 | 10/2016 | Peterson | |
| 2016/0352761 A1 | 12/2016 | McGrew et al. | |
| 2016/0366158 A1* | 12/2016 | Feng | H04L 63/145 |
| 2017/0163670 A1* | 6/2017 | Manadhata | H04L 63/1441 |

OTHER PUBLICATIONS

McGrew, U.S. Appl. No. 14/820,265, filed Aug. 6, 2015, Notice of Allowance dated Jan. 3, 2019.

McGrew, U.S. Appl. No. 14/820,265, filed Aug. 6, 2015, Final Office Action dated Nov. 29, 2017.

McGrew, U.S. Appl. No. 14/280,265, filed Aug. 6, 2015, Office Action dated May 17, 2018.

Wright et al, "On Inferring Application Protocol Behaviors in Encrypted Network Traffic", Journal of Machine Learning Research 7 (2006) 2745-2769, Submitted Mar. 2006; Revised Sep. 2006; Published Dec. 2006, 25 pgs.

Postel J., "User Datagram Protocol", ISI, dated Aug. 28, 1980, 3 pages.

Kadloor et al., "Low-Cost Side Channel Remote Traffic Analysis Attack in Packet Networks", dated 2010, 5 pages.

Isohara et al., "Kernel-Based Behavior Analysis for Android Malware Detection", dated 2011, IEEE Computer Society, pp. 1011-1015.

Information Sciences Institute, "Transmission Control Protocol", DARPA Internet Program, Protocol Specification, dated Sep. 198, http://www.rfc-base.org/txt/rfc-793.txt, 85 pages.

Hjelmvik et al., "Statistical Protocol IDentification with SPID: Preliminary Results", dated 2009, 5 pages.

European Patent Office, "Search Report" in application No. PCT/US2016/034145, dated Jul. 26, 2016, 10 pages.

European Claims in application No. PCT/US2016/034145, dated Jul. 2016, 4 pages.

Dhamankar et al., "Protocol Identification via Statistical Analysis (PISA)", Tipping Point, Black Hat, dated 2007, 30 pages.

Claise, B., "Information Model for IP Flow Information Export (IPFIX)", Internet Engineering Task Force (IETF), Cisco Systems, dated Sep. 2013, 24 pages.

Claise, B., "Cisco Systems NetFlow Services Export Version 9", Network Working Group, Request for Comments: 3954, Cisco Systems, dated Oct. 2004, 30 pages.

Amos et al., "Applying Maching Learning Classifiers to Dynamic Android Malware Detection at Scale", dated 2013, IEEE pp. 1666-1671.

* cited by examiner

DETECTION OF MALWARE AND MALICIOUS APPLICATIONS

BENEFIT CLAIM

This application claims the benefit under 35 U.S.C. § 120 as a continuation of application Ser. No. 14/820,265, filed Aug. 6, 2015, which claims the benefit under 35 U.S.C. § 119 of India application 2638/CHE/2015, filed May 26, 2015, the entire contents of which are hereby incorporated by reference as if fully set forth herein. Applicants hereby rescind any disclaimer of subject matter that may have been made in the parent application and advise the Office that the claims of the present application may be broader than those presented or granted in the parent application.

TECHNICAL FIELD

The present disclosure generally relates to improved methods, computer software and computer hardware in the field of security for computer networks. The disclosure relates more specifically to improved computer-based network infrastructure devices and computer-implemented techniques that can perform classification of data flowing across a network.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer networks are ever growing in their size and complexity. Every day, an unfathomable amount of information is sent within individual networks, and from network to network. Any type of information may be sent on computer networks, from text and pictures, to songs and movies. The information sent on computer networks may take many different formats, both encrypted and unencrypted. Some information sent on computer networks may be sent from, sent to, or associated with, malicious programs and/or devices. Administrators and users of networks could benefit greatly if improved ways of detecting potentially malicious information traveling across computer networks were developed.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are provided for application classification and malware detection through remote monitoring and analysis of datagram lengths and times. Specifically, the length and times of datagrams may be reported, and later analyzed.

In one embodiment, a network infrastructure device receives a flow comprising a plurality of packets. The network infrastructure device determines that a first subset of the plurality of packets corresponds to a first datagram, and that a second subset of the plurality of packets corresponds to a second datagram. The network infrastructure device determines a length of the first and second datagram and a duration value between an arrival time of the first datagram and an arrival time of the second datagram. Subsequently, the lengths and the duration value is sent to a separate collector device. The collector device receives the lengths and the duration value. An application identifier of an application that is associated with the lengths and the duration value may be determined, and a determination may be made regarding whether the application is a malicious application.

Example System Implementation

Figure 1:
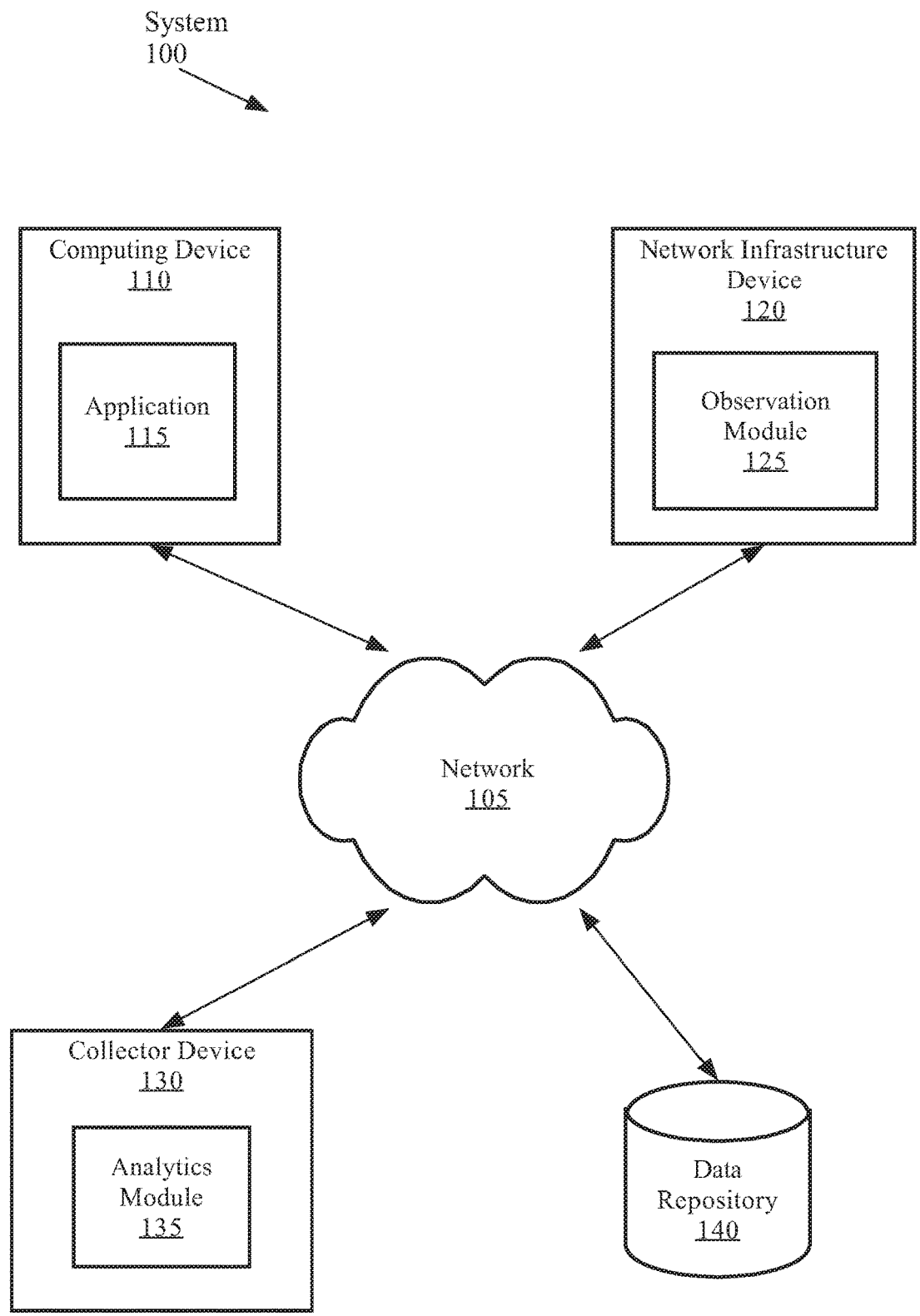
FIG. 1 shows a block diagram of a system in accordance with an embodiment of the invention.

FIG. 1 illustrates an example computer system 100 in which the techniques described may be practiced, according to some embodiments. System 100 is a computer-based system. The various components of system 100 are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. System 100 illustrates only one of many possible arrangements of components configured to execute the programming described herein. Other arrangements may include fewer or different components, and the division of work between the components may vary depending on the arrangement.

System 100 includes network 105, computing device 110, application 115, network infrastructure device 120, observation module 125, collector device 130, analytics module 135, and data repository 140. Network 105 may be any kind of computer network using any combination of wired and/or wireless communication, including, but not limited to: a Local Area Network (LAN), a Wide Area Network (WAN), the Internet, a company network, etc. Although a single network 105 is depicted in FIG. 1, any number of networks 105 may be present. Generally, network 105 allows computing device 110 to communicate with other computing devices connected to the network. The communication may include any type and/or amount of data, and may be communicated using any format or standard. In one embodiment, the information sent over network 105 is encrypted. Alternatively, the information sent over network 105 may not be encrypted, or may be some combination of encrypted and unencrypted.

In one embodiment, the information sent over network 105 takes the form of flows. A flow is a sequence of packets sent from a source to one or more destinations. A flow may contain any number of packets, and may use any format or standard, both encrypted and/or unencrypted. A flow may originate, for example, from an application. Consider a web browser accessing a web page. In this example, a first flow is sent by the web browser to the website to request information about a web page a user would like to view. In response, a second flow is sent from the website to the web browser containing the requested information.

Within a flow, packets form identifiable groupings called datagrams. Specifically, a datagram is a single message carried by a transport protocol. Examples of transport protocols include, but are not limited to: Transmission Control Protocol (TCP) and User Datagram Protocol (UDP). A datagram may span any number of packets, depending on the size of the message being conveyed. As discussed below, tracking the length and times of datagrams enables conclusions to be drawn about the application or device associated with the flow.

In one embodiment, computing device 110 is any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, minicomputers, servers, racks, and the like. Computing device 110 is communicatively connected to network 105, and sends information, in the form of flows, to recipients using network 105. Although FIG. 1 shows a single computing device 110, any number of computing devices may be connected to network 105. Computing device 110 may include applications, software, and/or other executable instructions to facilitate various aspects of embodiments described herein. Specifically, computing device 130 includes application 115.

In one embodiment, application 115 is any application, software, or other executable instructions representing a stored program. As an example, application 115 may be a web browser, a video game, productivity software, etc. Application 115 may cause a flow to be sent to a destination. The specifics of the datagrams within the flow sent by application 115 may be identifiable, such that, given the lengths and times of a portion of datagrams of a flow, application 115 can be identified as the source of the flows. Application 115 may be a malicious program, such as malware, a virus, etc. Alternatively, application 115 may be a program with no malicious features.

In one embodiment, network infrastructure device 120 is any networking component and/or computing device such as a packet data router or packet switch. Other embodiments could use, rather than an infrastructure device, an endpoint computing device such as a server computer, personal computer, workstation or other computing device, logically positioned in FIG. 1 in place of network infrastructure device 120. Network infrastructure device 120 may include any suitable hardware components, such as memory, a processor, etc. In one embodiment, network infrastructure device 120 is communicatively connected to network 105. Optionally, network infrastructure device 120 may be a component within network 105. Network infrastructure device 120 may be responsible for routing and/or forwarding of flows. Alternatively, network infrastructure device 120 may be an observer, and not responsible for any routing and/or forwarding of flows.

In one embodiment, network infrastructure device 120 includes programming to execute software applications and/or modules. Specifically, network infrastructure device 120 executes observation module 125, which includes programming to determine datagrams within a flow, determine the length of datagrams, determine the duration between datagrams, and send datagram length and time data to collector device 130. In one embodiment, network infrastructure device 120 temporarily stores data collected about datagrams.

In one embodiment, observation module 125 includes programming to determine and track data about datagrams in a flow. A flow may have any number of datagrams. Observation module 125 may track the first couple datagrams of a given flow, such as the first 5 datagrams, first 10 datagrams, or any other number of datagrams. Alternatively, all datagrams within a flow may be tracked, etc. The data tracked by observation module 125 is at least the length of the datagram and the duration between the arrivals of datagrams. However, additional data may be tracked and/or determined about datagrams. Even when the packets themselves are encrypted, observation module 125 is able to track and determine the datagrams within a flow.

In one embodiment, observation module 125 includes programming to determine the length of a datagram. The length of a datagram is expressed as the number of bytes of application, or message, data within a datagram. Alternatively, the length may be expressed in bits, or any other suitable measurement. In one embodiment, observation module 125 calculates the length of a datagram by assuming that all of the packets within a flow that arrive in rapid succession correspond to a single datagram. The lengths of the rapidly arriving packets are summed to generate the length. Optionally, the length of the transport headers, such as TCP or UDP, are subtracted from the length to provide a more accurate representation of application data length. Additionally, by subtracting the length of transport headers, SYN and ACK packets are effectively ignored, as their length will be zero.

In one embodiment, observation module 125 determines the length by accessing the protected record length in the Secure Sockets Layer (SSL)/Transport Layer Security (TLS) protocols. The protected record length in SSL/TLS accurately identifies the length of application data within a packet, and thus my produce more accurate results than estimating the length of headers and subtracting to determine the length of a datagram. Alternatively, any other method of determining the length may be used.

In one embodiment, observation module 125 includes programming to determine the duration value between datagrams. Specifically, the arrival of every packet may be timed. Packets that arrive within a threshold are deemed to be part of the same datagram. The threshold may be set to any suitable amount, and may vary based on the origin of the flow, level of network congestion, or any other factor. For example, a threshold of five milliseconds may be selected for flows arriving from the Internet. Thus, if a packet arrives from the Internet within five milliseconds of a previous packet, those packets are deemed to be a part of the same datagram. Conversely, if a packet arrives from the Internet more than five milliseconds after a prior packet, those packets would be deemed to be part of two separate datagrams. As another example, a threshold of two milliseconds may be selected if the origin of the flow is within the same network as the destination. In one embodiment, to determine the duration value between datagrams, observation module 125 subtracts the arrival times of subsequent datagrams.

In one embodiment, observation module 125 includes programming to use the TCP timestamp to determine the duration value between datagrams. When a flow uses TCP, the TCP timestamp option may be used. The TCP timestamp is an encoded timestamp value that is included in the TCP header for packets. When a TCP endpoint acknowledges a packet with the TCP timestamp option enabled, a timestamp echo reply is included. Thus, when an endpoint receives an acknowledgement for a packet that was previously sent, the endpoint also receives the timestamp indicating when the packet was sent. The round trip time is computed by subtracting the timestamp echo reply value from the current time. Observation module 125 includes programming to use the TCP timestamp values for determining duration values between datagrams when the flow has enabled the TCP timestamp option.

In one embodiment, observation module 125 includes programming to use a TCP acknowledgement number to determine datagram lengths, when a TCP session consists of synchronous communication. Specifically, the TCP acknowledgement number is sent by a TCP endpoint to acknowledge receipt of data from the other endpoint. When a flow contains a TCP packet that contains application data, and has an acknowledgement number that is equal to the acknowledgement number of the previous packet in the flow, that application data is a continuation of the same TCP datagram carried in the previous packet. In contrast, when a flow contains a TCP packet that contains application data, and has an acknowledgement number greater than that of the previous packet, then that application data is the start of a new datagram. Observation module 125 includes programming to use the TCP acknowledgement number values for determining how the data in packets corresponds to TCP datagrams.

In one embodiment, observation module 125 includes programming to send datagram length and time data to collector device 130. When sending datagram length and time data to collector device 130, not all received datagrams may be reported. For example, if a flow contained 50 datagrams, observation module 125 may send data about the first seven datagrams to data collector device 130. Alternatively, observation module 125 may send data about the first three non-zero length datagrams to collector device 130. Observation module 125 may continuously send data to collector device 130, or may send data at predetermined intervals, or any other suitable method may be used. In one embodiment, observation module 125 includes programming to perform run length encoding of any data sent to collector device 130. Run length encoding may be used to reduce the size of data reported to collector device 130, thereby reducing the amount of data that must be sent on the network, and reducing the amount of data stored in the data repository 140.

In one embodiment, observation module 125 does not determine the correspondence between packets and datagrams and, instead of reporting the length of datagrams within a flow, observation module 125 reports the length of application data that is carried in each packet. This information can be processed by analytics module 135 in any of a number of ways. One such was is the estimation of datagram lengths based on the lengths of application data carried in each packet. The analytics module 135 can perform this estimation, then use those estimates as the inputs to further processing.

The length and time data may be sent to collector device 130 in a variety of electronic digital data formats. In one embodiment, a first format used by observation module 125 is a Bidirectional Sequence of Application Lengths and Times (BSALT), which may be used to convey data relating to a bidirectional flow. Specifically, a BSALT contains a received length array and a sent length array, followed by a received time array and a sent time array. Each array may be of N unsigned16 integers. Unsigned16 integers are able to represent integer values from 0 to 65,535. Thus, when the length of a datagram exceeds 65,535, the datagram length may not be accurately reported.

In one embodiment, a second format used by observation module 125 is a Sequence of Application Lengths and Times (SALT). Specifically, SALT contains a first array for representing the lengths of datagrams in a flow, and a second array for representing the difference between the observation/arrival times of two successive datagrams of the flow. Each array may be of N unsigned16 integers. Optionally, data in the SALT format may be sent to collector device 130 before a flow has completed, if the first array is full of non-zero values.

In one embodiment, observation module 125 includes programming to filter flows. Specifically, observation module 125 may track datagram lengths and times of certain specified flows, while ignoring other flows. Observation module 125 may filter flows using any suitable characteristics, such as Internet Protocol (IP) address, port, protocol, flow count, date first seen, date last seen, encryption, etc. Additionally, observation module 125 includes programming to send data to collector device 130 at user configurable times, such as: once per N flows, once per high volume flows in N time, once for each distinct endpoint pairs, always send all data for all flows, send no more than X bytes of data from flows, send data for statistically low occurrence flows, etc.

In one embodiment, collector device 130 is any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, minicomputers, servers, racks, and the like. There may be any number of collector devices 130, receiving information about datagrams from any number of sources. Collector device 130 is communicatively connected to network 105 using any combination of wired and/or wireless connections. In one embodiment, collector device 130 executes analytics module 135, which includes programming for analysis of datagram length and time information. Alternatively, a separate device or devices may execute analytics module 135.

In one embodiment, analytics module 135 includes programming to gather training data. Specifically, training data may be gathered by executing one or more applications within a sandbox, and observing the flows initiated by the one or more applications. When observing the applications, the name of the application and a hash of the executable associated with the application are stored in addition to the datagram length and times. Additionally, since the applications are known, information can be stored relating to the maliciousness of the application. For example, applications may be "known good" or "known bad," meaning that the application has been determined to be a good application, or a malicious application, respectively. In one embodiment, analytics module 135 includes programming to access a file reputation server to determine the reputation of an application. The reputation may be included with the data gathered for training data, thereby enabling a classifier to be trained.

In one embodiment, analytics module 135 includes programming to train a classifier. The classifier is trained using the training data gathered by analytics module 135. Analytics module 135 may train the classifier in any suitable manner.

In one embodiment, analytics module 135 includes programming to identify an application associated with datagram length and time information. Analytics module 135 may identifying an application ID which may be used to determine the application associated with a flow. Analytics module 135 may identify a type of application, such as a web browser. Alternatively, or in addition, analytics module 135 may identify the name of a specific application, such as Internet Explorer, and/or may identifying a specific version of a named application, such as Internet Explorer 5.0. Internet Explorer is a trademark of the Microsoft Corporation, of Redmond, Wash. Analytics module 135 may determine the application associated with datagram length and time information in any suitable way. For example, analytics module 135 may use machine learning techniques to identify the nearest neighbors of a set of received datagram length and times, and use the label(s) associated with the nearest neighbors to make a decision. Alternatively, any other method may be used. Further, analytics module 135 may identify other information about a flow besides an application associated with the flow. In one embodiment, a protocol used by the flow, a device associated with a flow, or any other component, module, or application may be identified by analytics module 135.

In one embodiment, analytics module 135 may identify an application associated with datagram length and time information at any point in time. For example, upon receipt of datagram information, the information may be stored for later access. Before the information is accessed, the trained classifier may be updated with new knowledge of malware and other applications. Then, the stored information may be retrieved, thereby enabling the detection of malware that was unknown at the time the information was received.

In one embodiment, analytics module 135 includes programming to send and/or display an alert signal. Analytics module 135 may send the alert signal to any suitable device or location, such as an administrator or user device. Alternatively, the alert signal may be displayed on one or more devices associated with collector device 130. The alert signal may indicate that an application determined to be associated with received datagram length and time information is malicious, and that remedial actions should be taken. Alternatively, the alert signal may contain any other information, as configurable by an administrator or user of them system.

In one embodiment, data repository 140 is any suitable storage device such as one or more hard disk drives, memories, or any other electronic digital data recording device configured to store data. Although data repository 140 is depicted as a single device in FIG. 1, data repository 140 may span multiple devices located in one or more physical locations. Additionally, in one embodiment, data repository 140 may be located on the same device(s) as collector device 130. Alternatively, data repository 140 may be located on a separate device(s) from collector device 130. Data repository 140 may store any information received by collector device 130, such as datagram length and time information.

Example Functional Implementation 1

Figure 2:
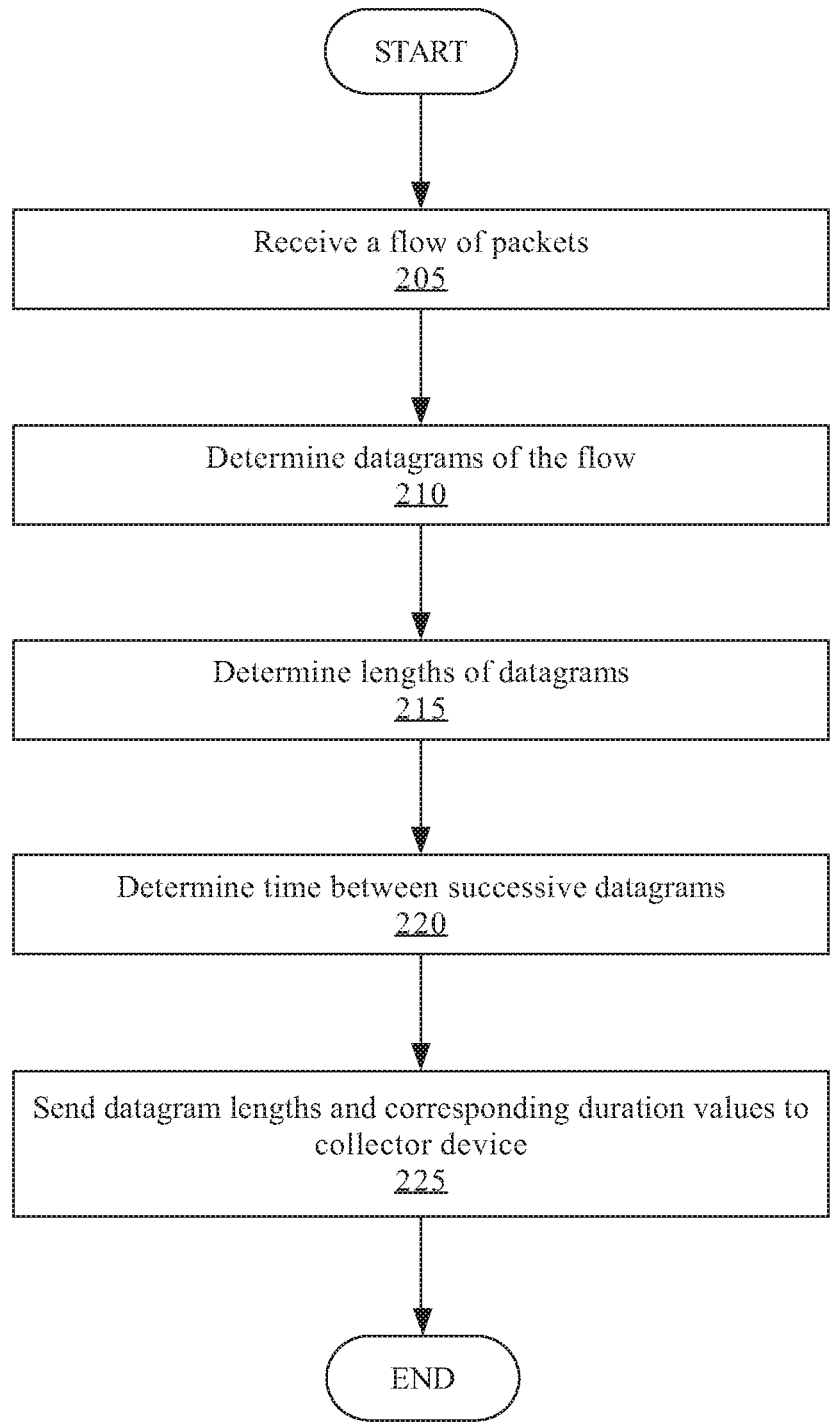
FIG. 2 shows a flowchart of a method in accordance with an embodiment of the invention.

FIG. 2 shows an example flowchart of a method for application classification and malware detection through remote monitoring and analysis of datagram lengths and times. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

In step 205, a flow of packets is received. The flow of packets may be formatted using any protocol, and may be encrypted or unencrypted. The flow may be of any length. Optionally, some flows may be filtered, such that selected flows of interest are further examined.

In step 210, datagrams of the flow are determined. Specifically, steps 210, 215, and 220 are performed as a group, and may be performed continuously, in any order, to determine the datagram length and times for a flow of packets. In one embodiment, step 210, 215, and 220 are performed in real time as a flow of packets is received. Alternatively, step 210, 215, and 220 may be performed after the fact if, for example, received packet data is temporarily stored on a network infrastructure device or other suitable device. Any number of datagrams may be determined for a given flow of packets. Optionally, a set number of datagrams will be identified, such as the first eight non-zero length datagrams of a flow, with subsequent datagrams ignored. Not all datagrams of a flow need to be determined because even with just the beginning of a flow, accurate determinations may be made about the application that created the flow.

In step 215, lengths of the datagrams are determined. The length is intended to measure the size, in bytes, of the application data within a datagram. The lengths of datagrams may be determined in any suitable manner. In one embodiment, packets that arrive in close proximity to each other, such as within five milliseconds, are determined to be part of the same datagram. The length of the closely arriving packets, in bytes, may be determined and summed. To increase the accuracy, headers and other formatting associated with a protocol used by the flow may be subtracted from the length. In one embodiment, packets may have a protected record length field, which may be accessed and used to determine the length of application data within a datagram.

In step 220, the time between successive datagrams is determined. In one embodiment, the arrival times of packets associated with datagrams are observed, and the time between successive datagrams may be determined by subtracting the arrival time of a successive datagram from a prior datagram. Thus, for example, if a first datagram arrives at time "5," and a second datagram arrives at time "12," the time between the first and the second datagram is "7."

In step 225, datagram lengths and corresponding durations between datagrams are sent to a collector device. The datagram lengths and times may be sent to a collector device in any format. For example, a B SALT or SALT format, as discussed above, may be used. In one embodiment, the datagram lengths and times may be sent continuously to a collector device. Alternatively, the datagram lengths and times may be sent periodically to a collector device, such as once a minute, once every 100 flows, etc. The datagram lengths and times may be sent to the collector device before the associated flow has completed. In other words, a flow may still be arriving at a network infrastructure device when the network infrastructure device sends datagram length and time information to a collector device. Further, not all datagrams within a flow need to be sent to the collector device. Rather, a limited subset, such as the first six datagrams with a non-zero application data length, may be sent to the collector device. Optionally, run length encoding may be used to reduce the size of the data sent to the collector device.

Example Functional Implementation 2

Figure 3:
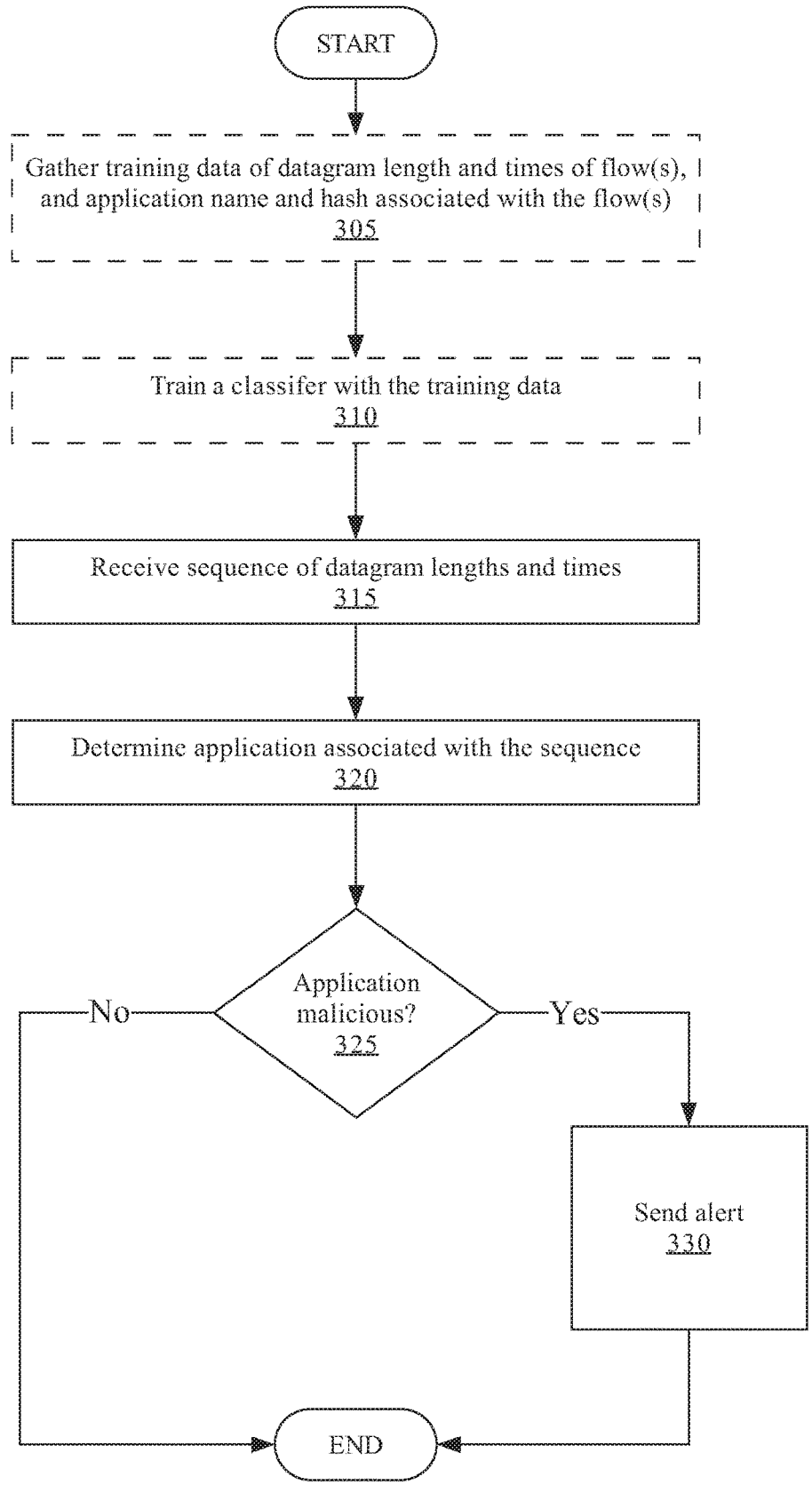
FIG. 3 shows a flowchart of a method in accordance with an embodiment of the invention.

FIG. 3 shows an example flowchart of a method for application classification and malware detection through remote monitoring and analysis of datagram lengths and times. Although the steps in FIG. 3 are shown in an order, the steps of FIG. 3 may be performed in any order, and are not limited to the order shown in FIG. 3. Additionally, some steps may be optional, may be performed multiple times, and/or may be performed by different components.

In step 305, training data of datagram length and times of flows, and application name and hash associated with the flows are gathered. The training data may be gathered in any suitable manner. In one embodiment, applications, both malicious and non-malicious, are allowed to execute in a sandbox, and any flows created by the applications are observed. In addition to the datagram length and time information, the name of the application and hash of the executable that created the flow are also tracked. Additionally, an application type (such as web browser, email client, messaging application, operating system process, etc.) may be collected and/or assigned.

In step 310, a classifier is trained using the training data. The classifier may be trained in any manner. In one embodiment, the classifier may store all training data received, and use that stored data as a basis for comparing any newly received datagram length and time information.

In step 315, a sequence of datagram lengths and times is received. The sequence of datagram lengths and times may be received in any manner and from any suitable source. The sequence of datagram lengths and times may be received in any format, such as B SALT, SALT, or any other format.

In step 320, an application associated with the sequence is determined. The application may be determined in any manner. In one embodiment, the application is determined by comparing the received sequence of datagram lengths and times to a database of datagram lengths and times that are associated with known applications. The nearest neighbor to the received sequence may be determined to be the application associated with the received sequence. In one embodiment, rather than determining the name of an application associated with a sequence, a type of application may be determined. Alternatively, more specific information may be determined, such as a name of an application and a version of the application. Optionally, step 320 may be performed at a later time. For example, when a sequence of datagram lengths and times is received, the sequence may be stored, and accessed at a later date—such as a week later. In the intervening time between the storing and accessing, the trained classifier may be updated with new information, allowing for the detection of previously unknown malware.

In step 325, a determination is made whether the application is malicious. The determination may be made in any suitable manner. In one embodiment, the file type may be checked against a file reputation service to determine whether a file that created a flow is known malicious, likely malicious, neutral, likely good, or known good. If the application is not malicious, the method ends. If the application is malicious, the method proceeds to step 330.

In step 330, an alert signal is sent. The alert signal may be sent to any suitable device, such as an administrator or user computer, a mobile device, etc. Alternatively, or in addition, the alert signal may be displayed on the device that performed the analysis, or any other device. The alert signal may indicate that suspected malware or other threat has been detected. The alert signal may specify the name, type, version, or any other known information about the suspected malicious application, as well as any known information about the flow, such as source and/or destination IP address, date, time, location, etc.

Example Use Case

Figure 4:
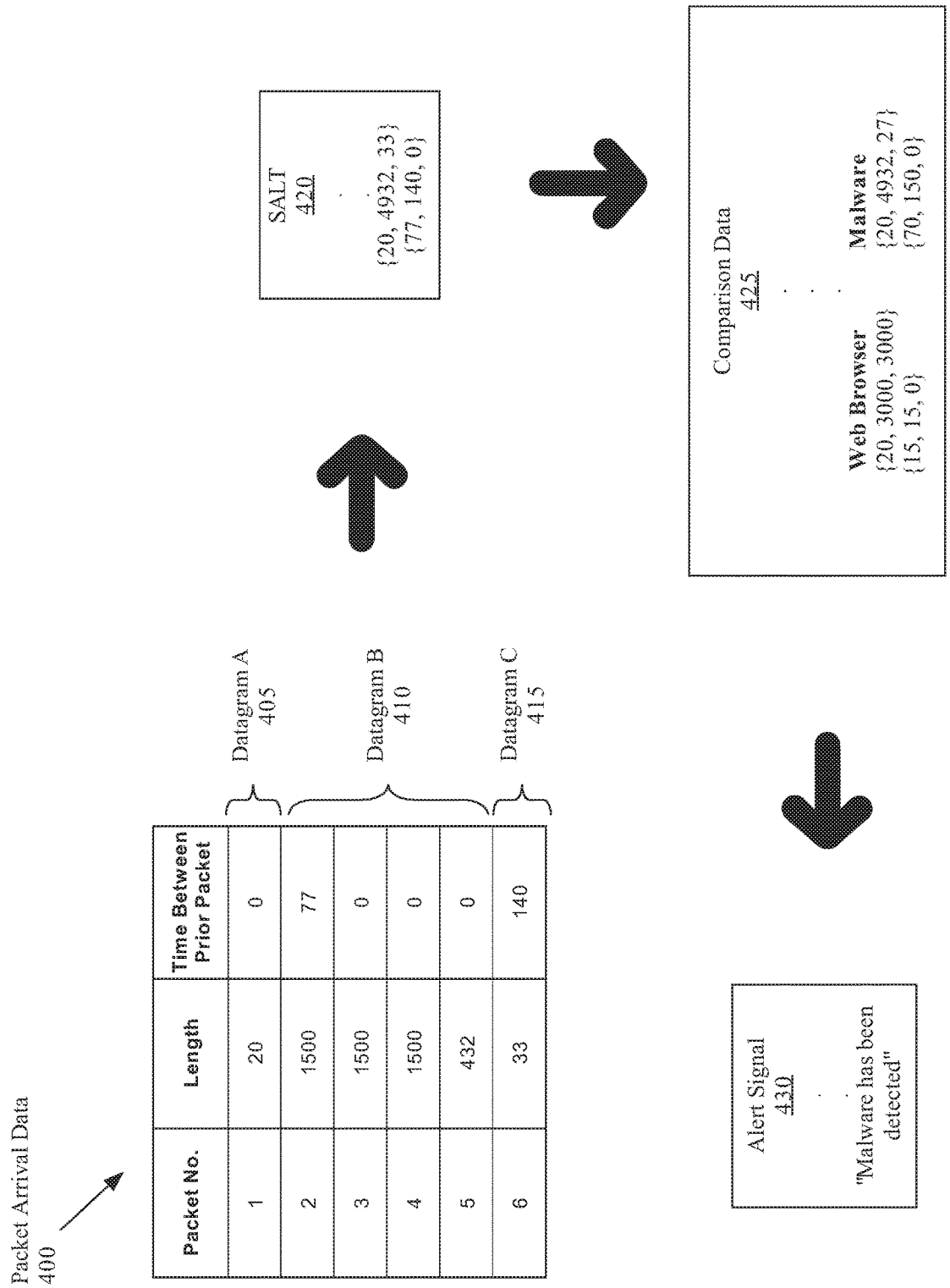
FIG. 4 shows an example in accordance with an embodiment of the invention.

FIG. 4 shows an example use case for application classification and malware detection through remote monitoring and analysis of datagram lengths and times. The example shown in FIG. 4 has been greatly simplified, to ease understanding and, as such, the example should not be construed to limit the disclosure to the specifics discussed below. Additionally, for the purposes of this example, a packet is assumed to be part of the same datagram as a prior packet if the packet arrives within 5 milliseconds of the prior packet, and a classifier has been previously trained to identify whether an application is malware.

Turning to the example, FIG. 4 shows packet arrival data 400. Packet arrival data 400 represents information about the arrival of packets within a flow from an unknown application. Packet arrival data 400 has been collected by a router. Six packets are shown in packet arrival data 400: Packet 1 has a length of 20 bytes, and a time from the prior packet of 0 milliseconds (because Packet 1 is the first packet of the flow, there cannot be a time from a prior packet), Packet 2 has a length of 1500 bytes, and a time from the prior packet of 77 milliseconds, Packet 3 has a length of 1500 bytes, and a time from the prior packet of 0 milliseconds, Packet 4 has a length of 1500 bytes, and a time from the prior packet of 0 milliseconds, Packet 5 has a length of 432 bytes, and a time from the prior packet of 0 milliseconds, and Packet 6 has a length of 33 bytes, and a time from the prior packet of 140 milliseconds.

The six packets form three distinct datagrams: datagram A 405 corresponds to packet 1, datagram B 410 corresponds to packets 2-5, and datagram C 415 corresponds to packet 6. The three datagrams are identified by the system based on the arrival times of the packets, because there was a large delay between the arrivals of packet 1 and packet 2, and packet 5 and packet 6, the router can identify the individual datagrams.

Once the individual datagrams are identified, the router prepares the associated datagram lengths and times for sending to a collector. The length of datagram A 405 is 20 bytes, as that is the length of packet 1. The length of datagram B 410 is 4932 bytes, as that is the combined length of packets 2-5. Similarly, the length of datagram C 415 is 33, as that is the length of packet 6. The time associated with datagram A 405 is 77 milliseconds, because the time refers to the duration between the arrival of datagram A 405 and datagram B 410. Thus, the time associated with datagram B 410 is 140 milliseconds, and there is no time associated with datagram C 415, as datagram C 415 is the last datagram in this example. This data is encoded into a SALT format.

SALT 420 shows the datagram lengths and times as sent to the collector. Specifically, two arrays are shown, a length array and a time array. The length array contains {20, 4932, 33} while the time array contains {77, 140, 0}. This information will enable the collector to determine an application associated with the flow. As the classifier has been previously trained, the two closest results from the classifier are shown in comparison data 425. Specifically, comparison data 425 shows a typical SALT from a web browser of {20, 3000, 3000} and {15, 15, 0}, and a typical SALT from malware of {20, 4932, 27} and {70, 150, 0}. Because the malware is a closer match, the system determines that the application that created the flow in this example is malware, and sends alert signal 430 showing that "malware has been detected!"

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
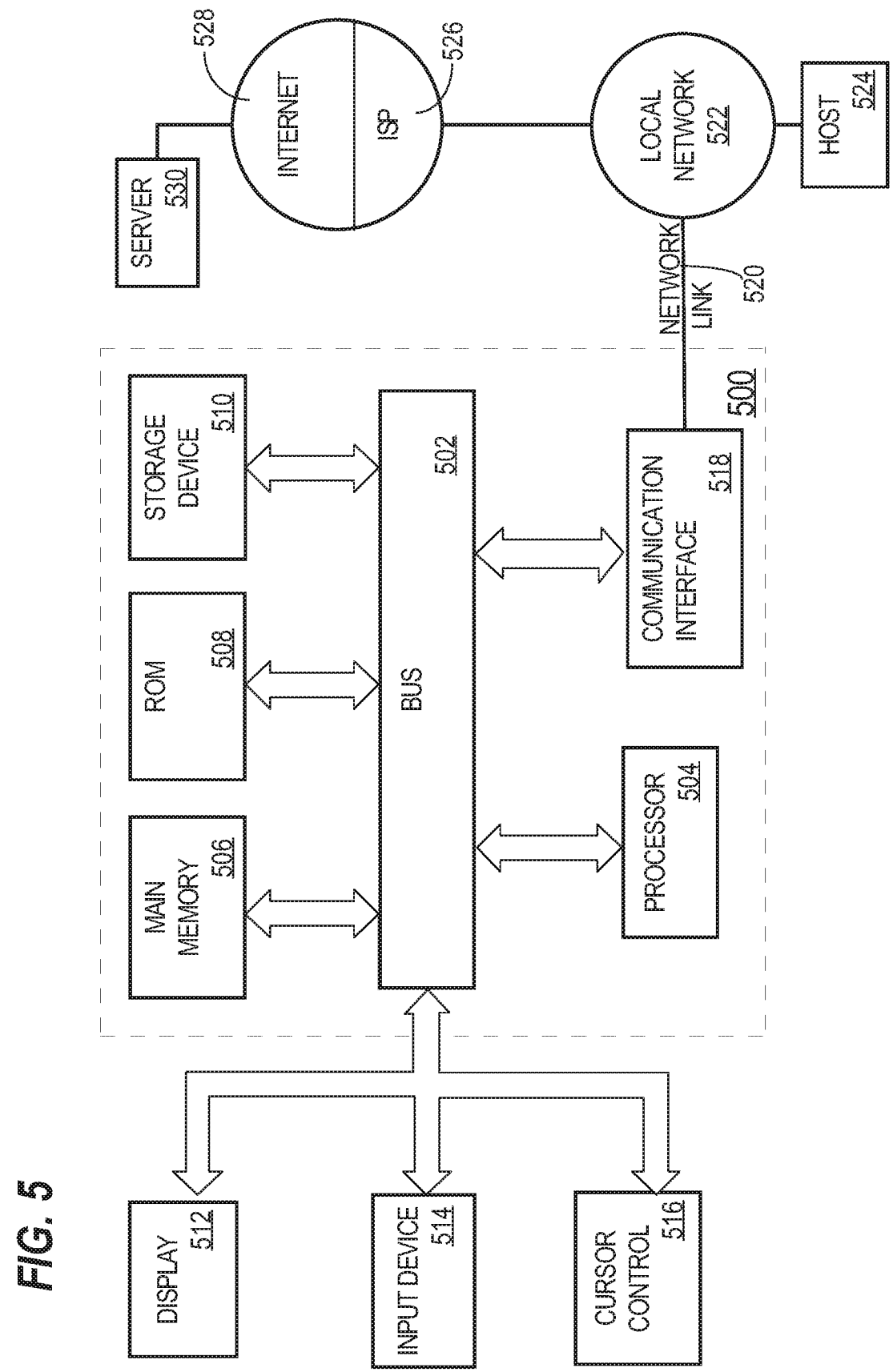
FIG. 5 shows a block diagram of a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522.

For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

The process described herein of determining flow length characteristics using a network infrastructure device, and the process of using a collector device to analyze the flow length characteristics and take responsive action, may be implemented independently or in combination. For example, when an independent approach is used, the collector device may be programmed to perform: receiving, at the collector device, a first length of a first datagram, a second length of a second datagram, and a duration between a first arrival of the first datagram and a second arrival of the second datagram; determining, using the first length, second length, and duration, an application associated with the first datagram and the second datagram; in response to determining that the application is a known malicious application, sending an alert; wherein the method is executed by one or more computing devices. In one approach, determining the application further comprises using a trained classifier, wherein the trained classifier is trained on training data from a software application reporting a name and a hash for the software application associated with a flow. The collector device may be programmed for accessing a file reputation service determine a reputation of the application. In some embodiments the application is a client application. In one approach, determining the application is performed in retrospect to detect a malicious application that was unknown when the first length, the second length, and the duration were received.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

APPENDIX A

This defines new data types that can be carried in Netflow v9 (RFC 3954) or the Information Model for IP Flow Information Export (IPFIX, RFC 7012). These data types carry information that is useful for detecting threats and for other security analytic and forensic goals.

This discusses the considerations around the use of experimental new information elements. These new information elements are defined using the abstract data types defined by IPFIX (RFC 7012, Section 3.1).

The PacketDataLength and PacketTime elements are intended to be used in an IPFIX basicList element, and thus provide a variable-length list of packet lengths and times, using the information model for that standard. The Netflow v9 elements PacketDataLengthList and PacketTimeList provide the same information, but are defined as arrays because Netflow v9 does not provide a list structure.

The basicList was used instead of subTemplateList because of the complexity of the latter format; also, it may be worthwhile to export only length information or only time information in some scenarios. Run-length encoding of the lengths, and compact encoding of the time values, were omitted to simplify the specification.

IPFIX

PacketDataLength
Description: the number of bytes (octets) in the application data portion of a packet that appeared in the flow. Values of zero should not be reported.
Data Type: unsigned16
Units: bytes (octets)
Range: zero to 65,535
ElementId: TBD1 with Enterprise Number=9 (Cisco Systems)
The application data portion of a packet should be determined by subtracting the number of bytes in the transport headers from the number of bytes in the IP packet. For TCP, the header length includes that of the fixed 20-byte TCP header and the length of any TCP Options or Padding that are present; this value can be computed by extracting the TCP Data Offset field from the TCP header, regarding that value as an unsigned integer, and multiplying it by four. The application data portion is zero-length for TCP SYN and ACK packets, and thus those packets should not be reported as PacketDataLength values.
For ICMP, the PacketDataLength value is the length of the ICMP packet, excluding the ICMP header; it can be computed by subtracting eight from the length of the IP packet.
For UDP, the PacketDataLength value is the length of the UDP packet, excluding the UDP header; it can be computed by subtracting eight from the length of the IP packet.
For protocols other than TCP, UDP, or ICMP, the PacketDataLength value is equal to the length of the data portion of the IP packet.
This element should be used in a basicList, with semantic=ordered (0x04), as illustrated below. The first PacketDataLength element in the list indicates the application data length of the first packet with non-zero application data length, the second element indicates the application data length of the second packet with non-zero length, and so on in strict order. The number of PacketDataLength elements within the list is variable, and is determined by the length of the basicList element. The length of the list should be set as follows: the list contains an element for each of the packets with non-zero application data length, or it contains 50 elements. PacketDataLength values of zero should not be included in the list, since those elements do not provide useful information.

For TCP, the PacketDataLength elements that appear in the list should appear in the same order in which they were sent, and should not include elements that correspond to retransmitted data. An observation point can detect retransmissions, and determine the correct ordering of elements, by observing the TCP Sequence Number in each packet, and temporarily storing the sequence number values corresponding to recently observed packets.

This specification does not accommodate packet loss, in the sense that any gap in the TCP sequence that an observation point sees cannot be represented in the list. It would be possible to amend the specification so that gaps can be represented, by changing the spec to say something like this: if an observation point sees packet loss, that is, a gap in the sequence of sent data, then a PacketDataLength element representing the gap should be included in the list, at the appropriate place in the sequence, with a value equal to the negative of number of bytes in the gap. (The fact that the PacketDataLength is negative indicates that it corresponds to a gap, rather than an observed packet.)

For UDP, ICMP, and other transport protocols, PacketDataLength elements should appear in the same order in which they were observed (which may be different than the order in which they were sent).

PacketTime
Description: the number of microseconds between the arrival of a packet with non-zero application data length that appeared in the flow. The determination of the data length of a packet is done as for the PacketDataLength element.
Data Type: unsigned32
Units: microseconds
Range: zero to 4,294,967,295
ElementId: TBD2 with Enterprise Number=9 (Cisco Systems)
This element should be used in a basicList, with semantic=ordered (0x04), as illustrated below. The first element indicates the arrival time of the first packet, and so on in strict order. The number of PacketTime elements within the list is variable, and is determined by the length of the basicList element. When a basicList of PacketTime elements is sent, it should be paired with a basicList of PacketDataLength elements, and each element in the list of PacketTime list should correspond to an element in the PacketDataLength list; that is, the elements correspond to the same packet within the flow.

SubTemplateMultiList
A subTemplateMultiList containing a list of PacketDataLength and PacketTime elements can be sent, instead of a basicList of PacketDataLength elements and a basicList of PacketTime elements.

Netflow v9
PacketDataLengthList
Description: a list of 50 unsigned16 elements, each of which contains the number of bytes (octets) in the data portion of a packet that appeared in the flow. The first element indicates the data length of the first packet, and so on in strict order. The application data portion of a packet SHOULD be determined by subtracting the length of the transport headers (including any TCP options) out of the total packet length; this value will be zero for TCP SYN and ACK packets. Packet data length values of zero should not be reported.
Value: TBD3
Length: 100 bytes (octets)

PacketTimeList
Description: a list of 50 unsigned32 elements, each of which contains the number of microseconds between the flow start time and the arrival of a packet that appeared in the flow. The first element indicates the arrival time of the first packet, and so on in strict order. Packet data length values of zero should not be reported.
Value: TBD4
Length: 200 bytes (octets)

Bidirectional Sequence of Application Lengths and Times (BSALT)
Field Type: B SALT
Value: 16,389 (Note: this number has not yet been assigned by IANA)
Length: 8*N bytes (Default: N=50)
Description: The BSALT information element conveys the length (number of bytes) of each application datagram, for the first several application datagrams within a flow, along with the number of milliseconds between the observation of each datagram.

An application datagram is a single message carried by a transport protocol such as TCP (RFC 793) or UDP (RFC 768). An application datagram typically spans multiple packets, and a Netflow observation point should estimate the size of an datagram by assuming that all of the packets within a flow that arrive in rapid succession correspond to a single datagram, then summing all of the lengths of the data portion of the TCP or UDP packets within a flow. The application data portion of a packet should be determined by subtracting the length of the transport headers (including any TCP options) out of the total packet length; this value will be zero for SYN and ACK packets.

The B SALT information element consists of two arrays recvd_length and sent_length of N unsigned16 integers, followed by two other arrays recvd_time and sent_time of N unsigned16 integers. Recall that the type "unsigned16" represents an integer value in the range 0 to 65,535. The recvd_length and sent_length arrays represent the lengths of the application datagrams in a flow, in the order that those datagrams were observed. If recvd_length[i] is not equal to zero or 65,535, that indicates that the ith application datagram contained recvd_length [i] bytes; similarly for sent__length[i]. If B[i] is equal to zero, that indicates that fewer than i application datagrams were transmitted; that is, the B array is padded with zero elements. If B[i] is equal to 65,535, that indicates that a datagram equal to or longer than 65,535 bytes was observed.

The arrays recvd_time and sent_time represent the difference between the observation times of two successive datagrams on the network. If recvd_time[i] is nonzero, then it denotes the number of milliseconds between the observation of the ith application datagram and the (i−1)th application datagram in the received direction. If recvd_size[i] is equal to zero, then recvd_time[i] should be set to zero as well. The array sent_time is similarly defined for packets in the sent direction.

The logic for determining the four arrays in a BSALT element is laid out in the following pseudocode, which uses these variables and constructs:

pkt: The packet that is to be processed, either a sent or received TCP packet. Can include Ethernet, IP and TCP headers.

sent_length[n]: An n-size array of the sizes of accumulated chunks of TCP data that are sent. This array is specific to a particular flow i.e. specific to a 5-tuple.

sent_time[n]: An n-size array of time-sent for each item in the sent_length array.

sent_length and sent_time thus will have the same index. For each index in the array the time-sent is relative to time-sent of the previous item except for the first index. The value of the first item in this array will be discussed in comments in the pseudocode. This array is specific to a particular flow i.e. specific to a 5-tuple.

sent_index: The current index into the sent_length and sent_time arrays.

last_sent_time: The last time (e.g. since system uptime) that a packet was sent.

recvd_length[n]: An n-size array of the sizes of accumulated chunks of TCP data that are received. This array is specific to a particular flow i.e. specific to a 5-tuple.

recvd_time[n]: An n-size array of time-received for each item in the recvd_length array. recvd_length and recvd_time thus will have the same index. For each index in the array the time-received is relative to time-received of the previous item except for the first index. The value of the first item in this array will be discussed in comments in the pseudocode. This array is specific to a particular flow i.e. specific to a 5-tuple.

received_index: The current index into the recvd_length and recvd_time arrays.

last_recvd_time: The last time (e.g. since system uptime) that a packet was received.

is_sent: A boolean indicating if the current packet is sent. If false then it is received.

last_was_sent: A boolean indicating if the previous pkt was a send (true) or receive (false).

current_time: The current time (e.g. since system uptime)

rtt: The Round Trip Time for the current flow. This is calculated as either the time between the first data packet that was sent and the first data packet that was received or the time between the last handshake packet and the first data packet if a data packet arrives before a data packet is sent. The RTT is calculated this way to resemble the Appflow RTT. To the RTT we add either 10% of the RTT or 5 ms, whichever is larger. This is to ensure that small fluctuations in packet receive and send times don't influence the decision making of whether to accumulate packets or not.

len(pkt): This is the length of the packet minus any Ethernet, IP and TCP headers i.e. it is just the amount of data sent or received by the application.

is_data_packet(pkt): Determines if a packet is a data packet, that is, a packet containing one or more bytes of application data.

When a new packet in a flow is observed, it is processed as described in the following algorithm (this code does not restrict the size to 65,535 as described above but that can easily be added):

```
if !is_data_packet(pkt):
    if is_sent && sent_index==0:
        last_sent_time = current_time
    if !is_sent && recvd_index==0:
        last_recvd_time = current_time
```

```
else:
    if( is_sent && sent_index == 0) | | (!is_sent && recvd_index == 0):
        if rtt == 0 && !is_sent:
            # when here, last_sent_time was either the last time
            # data was sent (most normal casse where a client
            # sends data after connecting) or where the client
            # sent the last ACK of the handshake and the server
            # immediately sent data (rarer case)
            rtt = max(1.1* (current_time - last_sent_time),
                current_time - last_sent_time + 0.005)
        if is_sent:
            sent_length[0] = len(pkt)
            sent_index++
            last_sent_time = current_time
            if recvd_length[0] > 0:
                sent_time[0] = rtt   # first data was
                # received before any data was sent (rare)
            else:
                sent_time[0] = 0  #data was first sent
                # (and none yet recieved). Normal case.
        else:
            recvd_length[0] = len(pkt)
            recvd_index++
            last_recvd_time = current_time
            if sent_length[0] > 0:
                recvd_time = rtt   #first data was sent
                # then we received (now) data. Normal case.
            else:
                recvd_time = 0   #data first received
                # after handshake but before data sent (rare)
    else:
        if is_sent:
            # if the last packet was also sent then check
            # if it was sent within the RTT time
            if last_was_sent && current_time - last_sent_time < rtt:
                # add pkt len to last index in the sent array
                sent_length[sent_index-1] += len(pkt)
            else:
                sent_length[sent_index] = len(pkt)
                sent_time[sent_index] = current_time - last_sent_time
                sent_index++
            last_sent_time = current_time
        else:
            # if the last packet was also recvd then check # if it was recvd
                within the RTT time
            if !last_was_sent && current_time - last_recvd_time < rtt:
                # add pkt len to last index in received array
                recvd_length[recvd_index-1] += len(pkt)
            else:
                recvd_length[recvd_index] = len(pkt)
                recvd_time[recvd_index] = current_time - last_recvd_time
                recvd_index++
            last_recvd_time = current_time
    # note that the following is not set for SYN,FIN or ACK packets
    last_was_sent = is_sent
```

Sequence of Application Lengths and Times (SALT)
Field Type: SALT
Value: 16,388 (Note: this number has not yet been assigned by IANA)
Length: 4*N bytes (Default: N=50)
Description: The SALT information element conveys the length (number of bytes) of each application datagram, for the first several application datagrams within a flow, along with the number of milliseconds between the observation of each datagram.

An application datagram is a single message carried by a transport protocol such as TCP (RFC 793) or UDP (RFC 768). An application datagram typically spans multiple packets, and a Netflow observation point should estimate the size of a datagram by assuming that all of the packets within a flow that arrive in rapid succession correspond to a single datagram, then summing all of the lengths of the data portion of the TCP or UDP packets within a flow. The application data portion of a packet should be determined by subtracting the length of the transport headers (including any TCP options) out of the total packet length; this value will be zero for SYN and ACK packets. The observation point should assume that packets that arrive within five milliseconds of each other belong to the same application datagram, although other timings may be used.

The SALT information element consists of an array B of N unsigned16 integers, followed by another array T of N unsigned16 integers. Recall that the type "unsigned16" represents an integer value in the range 0 to 65,535. The B array represents the lengths of the application datagrams in a flow, in the order that those datagrams were observed. If B[i] is not equal to zero or 65,535, that indicates that the ith application datagram contained B[i] bytes. If B[i] is equal to zero, that indicates that fewer than i application datagrams were transmitted; that is, the B array is padded with zero elements. If B[i] is equal to 65,535, that indicates that a datagram equal to or longer than 65,535 bytes was observed. The array T represents the difference between the observation times of two successive datagrams on the network. T[0] is the time in milliseconds since the SYN packet for a flow direction was received. If T[i] is nonzero (and i is >0), then it denotes the number of milliseconds between the observation of the ith application datagram and the (i−1)th application datagram. If B[i] is equal to zero, then T[i] MUST be set to zero as well. If the ith application datagram is longer than 65,535 bytes, then B[i] MUST be set to 65,535.

An observation point constructs the arrays B and T as follows. Upon the start of a new flow the index i is initialized to zero. When a new packet with l bytes of application data arrives t milliseconds after the most recent packet in the same flow (or for the first data packet the time since the SYN packet), the following procedure is used:

```
if l > 0
    if i > 0 and t <= RTT_EST
        if l+B[i-1] >= 65,535
            B[i-1] = 65,535
        else
            B[i-1] += l
        endif
    else
        B[i] = l
        T[i] = t
        i = i + 1
    endif
endif
```

Example

Let the pair (l, t) denote the length/in bytes and interpacket arrival time tin milliseconds of an application datagram. If the sequence of packets with lengths and times
(20, 17), (1500, 77), (1500, 0), (432, 0), (33, 140)
is observed in that order, then the B array would consist of the elements
{20,4932,33,0, . . . , 0}
in that order, and the T array would consist of the elements
{17, 77, 140, 0, . . . , 0}.

The SALT data type may be sent before a flow has completed, if and only if the entire B array is full of non-padding values (that is, the value 0 should not appear anywhere in the B array). This property ensures that there will be no ambiguity about the actual sequence of application datagram lengths in a flow, and those estimated after the collection of multiple SALT elements.

The SALT data type should not be used with flow aggregation.

The SALT element represents application datagrams rather than packets because datagrams correspond more closely to application behavior, and because datagram lengths and times can be represented more compactly than packet lengths and times. The SALT threshold should be chosen so that it does not mistake two distinct application datagrams for a single, longer datagram. It is better for the observation point to mistake a single datagram for two distinct datagrams. This is because, when a SALT element is being analyzed, it is possible for the analytic system to realize that two successive B values actually correspond to a single application datagram. However, the reverse is not as easy; an analytic system cannot easily infer that a single B value corresponds to multiple datagrams.

It may be desirable to have the T array contain the Binary Scientific Notation (BSN) representation of a time value, which would reduce the state needed by a SALT element by 25%.

It may be desirable to dynamically estimate the round trip time.

Initial Data Packet (IDP)
Field Type: IDP
Value: 16,386 (Note: this number has not yet been assigned by IANA)
Length: 1400 bytes
Description: The IDP information element conveys the first 1400 bytes (octets) of the first packet of a flow that contains data (that is, has a packet whose length exceeds the length of the header).

This data type is an octetArray. Its first octet is the first octet of the IPv4, IPv6, or ICMP header. If the IPv4, IPv6, or ICMP packet is less than 1400 bytes in total length, then the octetArray is padded with null (0x00) values.

Note that when an exporter is configured to export the IDP for each direction, it will export two IDP records if it observes a typical bidirectional TCP flow (in which data is conveyed in each direction). In addition, if the exporter is configured to send other data elements, a third record must be sent.

The IDP data type should not be used with flow aggregation. The IDP record should be exported as soon as possible, so that the exporter can avoid storing the data longer than needed. Most other flow records should not be included with this data element. Sequence of Packet Lengths and Times (SPLT)
Field Type: SPLT
Value: 16,387 (Note: this number has not yet been assigned by IANA)
Length: 3*N bytes (Default: N=50)
Description: The SPLT information element conveys the length (number of bytes) of each packet, for the first several packets in a flow, along with the arrival times of those packets. It is different than the SALT element in that the SPLT represents a sequence of packets, while the SALT represents a sequence of application datagrams.

This information element consists of an array of N signed16 integers B, as defined in the Sequence of Packet Lengths (SPL) element, followed by an array T of N unsigned16 integers. The array B represents the lengths of the application data in the packets, in the order that those packets were observed, using a run length encoding. The array T represents the difference between the observation times of two successive runs of packets on the network. If T[i] is nonzero, then it denotes the number of microseconds between the observation of the (i+1)st run and the ith run.

Let B[i] denote the ith signed16 element in the array. If B[i]≥0, then B[i] represents the length of the application data in a packet. If −32768<B[i]<0, then −B[i] represents the number of packets that were observed that had an application data length equal to the last indicated application data length, not including that last packet. (The last indicated length is the value B[j] where j is the smallest value less than i such that B[j]>0.) If B[i]=−32768, then the value B[1] indicates the absence of packets in the flow; the value −32768 is used to pad the end of the array in cases where the entire flow can be represented without using every element of the array.

The length of the application data in a packet is the number of bytes in the packet, less the number of bytes in the IPv4 or IPv6 header and the TCP or UDP header (including header options, if any). An observation point SHOULD check the TCP Data Offset field, the IPv4 IHL field, and the IPv6 Next Header field, to determine the length of the TCP or IPv4 options that may be present, and the IPv6 header extensions that may be present.

Example

If the sequence of packets with application data lengths
{20, 1500, 1500, 1500, 432}
is observed in that order, then the SPL array would consist of the elements
{20, 1500, −2, 432, −32768, −32768, . . . , −32768}
in that order.
Recall that the minimum lengths of IPv4 packets are 20 bytes.
The array T is defined as follows. If B[i]≥0, then T[i] represents the arrival time of the packet corresponding to the element B[i] in the B array. If −32768<B[i]<0, then T[i] represents the arrival time of the last packet in the sequence of packets corresponding to the element B[1] in the B array. If B[i]=−32768, then the value of T[i] has no meaning; it MUST be ignored by the receiver and SHOULD be set to 0 by the sender.
The SPLT data type may be sent before a flow has completed, if and only if the entire array is full of non-padding values (that is, the value −32768 must not appear anywhere in that array).
This property ensures that there will be no ambiguity about the actual sequence of packets lengths in a flow, and those estimated after the collection of multiple SPL data elements. The SPLT data type should not be used with flow aggregation.
An implementation may use the following practical approach to computing the SPLT data. The length of the last packet observed in a flow is stored in a variable Q, and the length of the current run is stored in a variable R, along with the last index i into the signed16 array. Before processing a flow, R and i initialized to 0, and Q is initialized to a value that L can never assume (any negative value will do). When a new packet of length L arrives, it is processed as follows:

```
if (L is equal to Q)
    set R to R+1
    set B[i] to -R
else
    if (R is equal to 0)
        set Q to L
        set B[i] to Q
        set i to i+1
    else
        set R to 0
        set Q to L
        set i to i+1
        set B[i] to Q
        set i to i+1
    endif
endif
return the array B and its length i
```

In the future, it may be desirable to have the T array contain the Binary Scientific Notation (BSN) representation of a time value, which would reduce the state needed by a SALT element by 25%.
It may be desirable to dynamically estimate the RTT.
Filtering Flows
Because the SPL, SPT, SPLT, and IDP data types require more storage, computation, and bandwidth than typical Netflow records, it is important that an exporter that implements these data types be configurable so that it can export these data types only on flows of interest. In this section, we outline how flows should be configurable.
Within the exporter maintain two lookup tables, initiator and responder, that have the following minimum elements. The IP, protocol, and port should be the index into this lookup table. The Initiator IP and port should be the index into the leaf.
  IP Address (ipv6)
  Port (if TCP, UDP)
  Protocol (tcp, udp, etc)
  Flow Count (INT)
  First Seen (TS)
  Last Seen (TS)
  Data Sent Last (TS)
It should be possible to randomly select flows from the list for data capture depending on frequency, age, and random selection.
Provide configurable limits and selection criteria
For load and bandwidth considerations it should be possible to define limitations, some suggestions are:
  Only send data once per N flows
  Only send data once for high volume flows in N time
  Only send data once for distinct endpoint pairs
  Always send data for all flows
  Send no more that X bytes of data from flows
  Send data for statistically low occurrence flows
  Etc
Enable Regular Expression Defined Expanded Data Capture and Export for a Given Flow
It should be possible to define a limited set of regular expressions, applying to an optionally defined list of target flows and triggering the export of a configurable amount of additional data for that flow. E.g., if a flow within 10.230.0.0/16 matches/^.*zynga.com/within the first 2048 bytes then export the next 4096 bytes of data for the flow.

What is claimed is:
1. A computer-implemented method comprising:
  receiving, at a network infrastructure device, an encrypted flow comprising a plurality of packets, the plurality of packets comprising a first set of packets and a second set of packets that is received after the first set of packets;
  identifying, at the network infrastructure device, a first datagram comprising the first set of packets and a second datagram comprising the second set of packets, the first datagram being associated with a first message and the second datagram being associated with a second message, wherein each packet of the first set of packets is received within a threshold amount of time of receipt of a preceding packet of the first set of packets, and wherein a first packet of the second set of packets is received after the threshold amount of time of receipt of a last packet of the first set of packets;

determining, at the network infrastructure device, a sequence of datagram lengths and times for the first datagram and the second datagram within the encrypted flow based on an arrival time of the first sets of packets and the second set of packets; and sending, from the network infrastructure device, the sequence of datagram lengths and times to a collector device, wherein, upon receiving the sequence of datagram lengths and times, the collector device identifies a sequence of lengths and times that is nearest to the received sequence of datagram lengths and times as an application associated with the received sequence of datagram lengths and times, determines whether the application is malicious, and upon determining that the application is malicious, sends an alert signal to an administrator, and wherein the alert signal indicates that a suspected malware or a threat has been detected, and the alert signal comprises at least one of a name, a type, a version of the malicious application or information regarding the flow.

2. The computer-implemented method of claim 1, wherein the sequence of datagram lengths and times for the first datagram and the second datagram comprises a first length of the first datagram, a second length of the second datagram, and a duration value between a first arrival time of the first datagram at the network infrastructure device and a second arrival time of the second datagram at the network infrastructure device.

3. The computer-implemented method of claim 1, wherein determining the application that is associated with the received sequence of datagram lengths and times comprises:
   retrieving information from a database of datagram lengths and times that is associated with known applications;
   comparing the received sequence of datagram lengths and times to the information retrieved from the database of datagram lengths and times.

4. The computer-implemented method of claim 1, wherein determining the application that is associated with the received sequence of datagram lengths and times comprises:
   determining at least one of a name, a type, or a version of the application associated with the received sequence of datagram lengths and times.

5. The computer-implemented method of claim 1, further comprising:
   generating training data based on the sequence of datagram lengths and times for the first datagram and the second datagram; and
   training a machine learning-based classifier using the generated training data for detecting whether the application is malicious.

6. The computer-implemented method of claim 5, further comprising:
   in response to receiving the sequence of datagram lengths and times at the collector device, storing the sequence of datagram lengths and times;
   updating the trained classifier with the received sequence of datagram lengths and times; detecting a previously unknown malware based on the updated trained classifier.

7. The computer-implemented method of claim 1, further comprising:
   upon determining that the application is malicious, displaying the alert signal in a computer-generated graphical user interface of the collector device.

8. A system comprising:
   a network infrastructure device comprising a first memory unit and one or more first processors configured to perform instructions stored in the first memory unit; and
   a collector device comprising a second memory unit and one or more second processors configured to perform instructions stored in the second memory unit,
   wherein the network infrastructure device is configured to:
      receive an encrypted flow comprising a plurality of packets, the plurality of packets comprising a first set of packets and a second set of packets that is received after the first set of packets;
      identify a first datagram comprising the first set of packets and a second datagram comprising the second set of packets, the first datagram being associated with a first message and the second datagram being associated with a second message, wherein each packet of the first set of packets is received within a threshold amount of time of receipt of a preceding packet of the first set of packets, and wherein a first packet of the second set of packets is received after the threshold amount of time of receipt of a last packet of the first set of packets;
      determine a sequence of datagram lengths and times for the first datagram and the second datagram within the encrypted flow based on an arrival time of the first sets of packets and the second set of packets; and
      send the sequence of datagram lengths and times to a collector device, and
   wherein the collector device is configured to:
      upon receiving the sequence of datagram lengths and times, identify a sequence of lengths and times that is nearest to the received sequence of datagram lengths and times as an application associated with the received sequence of datagram lengths and times;
      determine whether the application is malicious; and
      upon determining that the application is malicious, send an alert signal to an administrator,
   wherein the alert signal indicates that a suspected malware or a threat has been detected, and the alert signal comprises at least one of a name, a type, a version of the malicious application or information regarding the flow.

9. The system of claim 8, wherein the sequence of datagram lengths and times for the first datagram and the second datagram comprises a first length of the first datagram, a second length of the second datagram, and a duration value between a first arrival time of the first datagram at the network infrastructure device and a second arrival time of the second datagram at the network infrastructure device.

10. The system of claim 8, wherein the collector device is further configured to:
   retrieve information from a database of datagram lengths and times that is associated with known applications; and compare the received sequence of datagram lengths and times to the information retrieved from the database of datagram lengths and times.

11. The system of claim 8, wherein the collector device is further configured to:
   determine at least one of a name, a type, or a version of the application associated with the received sequence of datagram lengths and times.

12. The system of claim 8, wherein the collector device is further configured to:
   generate training databased on the sequence of datagram lengths and times for the first datagram and the second datagram; and
   train a machine learning-based classifier using the generated training data for detecting whether the application is malicious.

13. The system of claim 12, wherein the collector device is further configured to:
   in response to receiving the sequence of datagram lengths and times at the collector device, store the sequence of datagram lengths and times;
   update the trained classifier with the received sequence of datagram lengths and times; and
   detect a previously unknown malware based on the updated trained classifier.

14. The system of claim 8, wherein the collector device is further configured to:
   upon determining that the application is malicious, display the alert signal in a computer-generated graphical user interface of the collector device.

15. One or more non-transitory computer readable media comprising instructions which, when executed by one or more processors, cause:
   receiving, at a network infrastructure device, an encrypted flow comprising a plurality of packets, the plurality of packets comprising a first set of packets and a second set of packets that is received after the first set of packets;
   identifying, at the network infrastructure device, a first datagram comprising the first set of packets and a second datagram comprising the second set of packets, the first datagram being associated with a first message and the second datagram being associated with a second message, wherein each packet of the first set of packets is received within a threshold amount of time of receipt of a preceding packet of the first set of packets, and wherein a first packet of the second set of packets is received after the threshold amount of time of receipt of a last packet of the first set of packets;
   determining, at the network infrastructure device, a sequence of datagram lengths and times for the first datagram and the second datagram within the encrypted flow based on an arrival time of the first sets of packets and the second set of packets; and
   sending, from the network infrastructure device, the sequence of datagram lengths and times to a collector device,
   wherein, upon receiving the sequence of datagram lengths and times, the collector device identifies a sequence of lengths and times that is nearest to the received sequence of datagram lengths and times as an application associated with the received sequence of datagram lengths and times, determines whether the application is malicious, and upon determining that the application is malicious, sends an alert signal to an administrator, and
   wherein the alert signal indicates that a suspected malware or a threat has been detected, and the alert signal comprises at least one of a name, a type, a version of the malicious application or information regarding the flow.

16. The one or more non-transitory computer readable media of claim 15, wherein the sequence of datagram lengths and times for the first datagram and the second datagram comprises a first length of the first datagram, a second length of the second datagram, and a duration value between a first arrival time of the first datagram at the network infrastructure device and a second arrival time of the second datagram at the network infrastructure device.

* * * * *

UNITED STATES PATENT AND TRADEMARK OFFICE
CERTIFICATE OF CORRECTION

PATENT NO. : 11,057,420 B2  
APPLICATION NO. : 16/370853  
DATED : July 6, 2021  
INVENTOR(S) : McGrew et al.

Page 1 of 1

It is certified that error appears in the above-identified patent and that said Letters Patent is hereby corrected as shown below:

In the Specification

Column 8, Line 64, please amend as shown:
in any format. For example, a BSALT or SALT format, as Column 9, Line 46, please amend as shown:
any format, such as BSALT, SALT, or any other format.

Column 16, Line 19, please amend as shown:
Field Type: BSALT

Column 16, Line 41, please amend as shown:
The BSALT information element consists of two arrays Column 19, Line 52, please amend as shown:
Let the pair (l, t) denote the length l in bytes and inter- Column 19, Line 53, please amend as shown:
packet arrival time t in milliseconds of an application data- Column 19, Line 55, please amend as shown:
{ (20, 17), (1500, 77), (1500, 0), (432, 0), (33, 140) }

Column 21, Line 9, please amend as shown:
value B[i] indicates the absence of packets in the flow; the Column 21, Line 37, please amend as shown:
of packets corresponding to the element B[i] in the B array.

Signed and Sealed this  
Fifth Day of October, 2021

Drew Hirshfeld  
*Performing the Functions and Duties of the*  
*Under Secretary of Commerce for Intellectual Property and*  
*Director of the United States Patent and Trademark Office*